Feb. 16, 1954   J. F. HAINES   2,669,667
DYNAMOELECTRIC MACHINE WITH SEALED ROTOR
Filed May 9, 1952
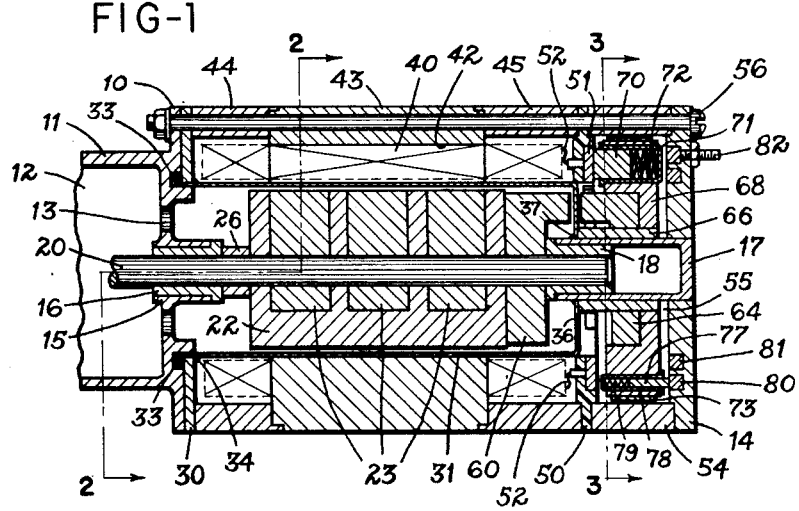
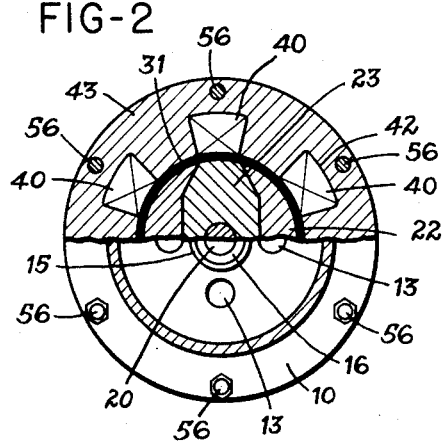
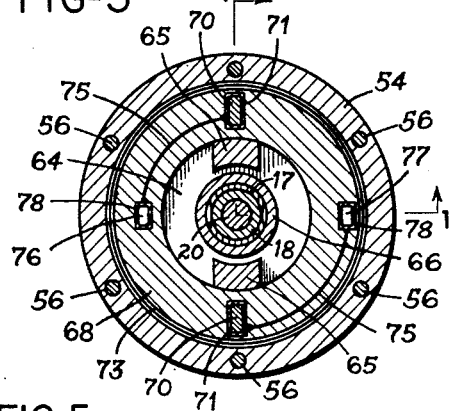
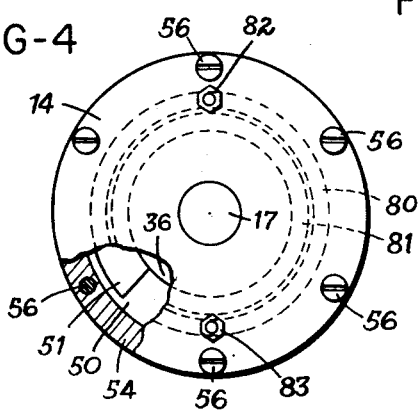
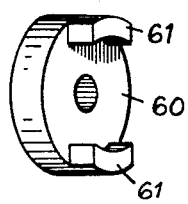
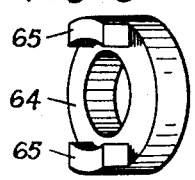
INVENTOR
JOHN F. HAINES
BY *Marechal Biebel French & Bugg*
ATTORNEYS Patented Feb. 16, 1954

2,669,667

UNITED STATES PATENT OFFICE 2,669,667

DYNAMOELECTRIC MACHINE WITH SEALED ROTOR

John F. Haines, Dayton, Ohio

Application May 9, 1952, Serial No. 286,951

14 Claims. (Cl. 310—40)

This invention relates to dynamoelectric machines and more particularly to such a machine the rotor of which operates in a sealed condition.

It is an object of the invention to provide a dynamoelectric machine such as a motor in which the rotor is completely sealed so that it can be in open communication with a pump or the like driven by the motor and with the bearings operating in the body of the fluid circulated by the pump.

It is also an object to provide such a machine employing a permanent magnet rotor with the armature coils in fixed relation upon the stator and with a sealing enclosure entirely enclosing the rotor and separating it from the stator.

It is a further object to provide such a machine in which brushes are caused to revolve over a fixed commutator by magnetic action effective through the sealed enclosure and without direct connection with the rotor.

Other objects and advantages will be apparent from the following description, the accompanying drawing, and the appended claims.

In the drawing—

Fig. 1 is a view in section of a dynamoelectric machine in accordance with the present invention, the upper half of the view being in vertical section and the lower half in horizontal section on the line 1—1 of Fig. 3;

Fig. 2 is a broken sectional view on the line 2—2 of Fig. 1;

Fig. 3 is a straight vertical section on the line 3—3 of Fig. 1;

Fig. 4 is an end elevational view with a portion of the end casing member being broken away to show the commutator; and Figs. 5 and 6 are perspective views of the cooperating magnetic members for causing the rotation of the brush assembly along with the rotor.

Referring to the drawings which illustrate a preferred embodiment of the invention the motor is shown as comprising an end plate or frame member 10 having a lateral casing extension 11, preferably formed integrally, which is adapted to receive an element to be driven by the machine such as a pump or the like. Casing 11 defines a chamber 12 within which the fluid handled by the pump or the like may circulate, and the end wall of plate 10 is formed with a plurality of holes 13 to allow the same fluid to circulate in and around the rotor. A corresponding end plate or frame member 14 is located at the opposite end of the machine.

Frame member 10 is formed with an elongated support 15 for receiving bearing 16. Similarly end plate 14 is formed to receive and support a sleeve 17 within which there is located the bearing 18. Shaft 20 is journaled in the respective bearing members 16 and 18.

The machine of this invention is provided with a rotating field and a stationary armature, and for this purpose a field structure 22 is mounted upon shaft 20 and is provided with a series of permanent magnets 23 of Alnico or other highly magnetizable material. As shown in Fig. 1, the field is preferably divided into a series of separate magnetic poles spaced axially of the shaft and suitably secured in the structure 22 as by being cast therein, three such magnetic structures being illustrated, the pole face being tapered in the manner illustrated in Fig. 2. It will be understood that each magnet 23 extends to diametrically opposite sides of the shaft, and that it may be formed with four or more salient poles if desired, thus forming a plurality of poles of opposite magnetic polarity. A spacer collar 26 is used to space the rotor structure in proper relation with respect to bearing 16.

The stator structure includes a ring 30 which is seated against the flange of end frame 10 and to the inner periphery of which there is secured the sealed container 31. Such container is in the form of a thin walled metal shell or can, one end being open, and adapted to be fitted radially within ring 30. Preferably an O-ring or other suitable seal 33 is positioned within a recess in end frame 10 and serves to completely seal the container 31 into the frame. Likewise the ring 30 may be welded around its periphery to the can 31 as indicated at 34.

At its opposite end the can has an inwardly turned portion 36 which is secured as by welding 37 to the sleeve 17, the sleeve 17 thus forming a means to prevent escape of any fluid passing through the bearing at the opposite end of the shaft. The can is formed of a thin gage sheet metal, to reduce the air gap as much as possible, and it is made of a material such as stainless steel or the like which is non-magnetic and has relatively high electrical resistivity. In this way the rotor is entirely sealed and separated from the stator, and because of the particular material employed, eddy current losses are reduced to a point where they are unobjectionable.

The armature windings are indicated at 40 being located in slots 42 in the stator magnetic structure 43. This magnetic structure is separated from ring 30 by spacers 44 at one end and 45 at the opposite end, allowing space for receiving the end connections for the windings.

An insulated disk 50 is mounted adjacent the outer portion of spacer 45 and this disk carries a series of commutator bars 51 which are suitably connected to the armature windings 40 as indicated at 52. A further spacer member 54 is located outwardly of disk 50, defining a space 55 in which there is received the rotatable brush carrier assembly. The entire stator structure so assembled is held together by a series of through bolts 56 which extend from the end frame 14 through the magnetic structure, the several spacers, and into frame 10 to thereby form a secure assembly which is capable of ready assembly and disassembly as desired.

In order to provide for the rotation of the brush carrier assembly, the motor 22 carries a permanent magnetic element 60 in the form of a disk which is mounted on shaft 20 for rotation with the rotor and which is formed with a pair of salient poles 61 extending axially outwardly in the direction shown. The faces of the extensions 61 closely approach the radial wall 36 of the container 31 and thus form a magnetic drive member directly adjacent the sealed end wall. If desired a construction may be utilized in which the pole faces 61 are formed integrally with the main field magnet 23 by directly attaching the pole extensions thereto, but it is preferred to utilize a separate magnetic element as illustrated, suitably formed of Alnico or the like.

On the outside of the container 31 there is a magnetic member 64 which may be either an electromagnet or a permanent magnet, and which has pole salients or extensions 65 projecting in the opposite direction toward and closely adjacent the radial wall 36 of the container. Hence the two pairs of poles are closely adjacent each other on opposite ends of the sealed container and in position to be driven one by the other. The member 64 is mounted on a bushing or sleeve 66 rotatable on bearing 17, and directly connected to a disk forming the brush carrier assembly 68. Brushes 70 are carried on opposite portions of the insulating disk 68, being mounted in carriers 71 and urged toward the commutator 51 by springs 72. An outer enclosing ring 73 strengthens the disk 68 against centrifugal force. Each brush is connected by means of wires 75 to brushes 76, 77, which as illustrated in Fig. 3 are mounted at different radial distances from the axis. These brushes are likewise supported in carriers 78 and urged outwardly by springs 79 against stationary rings 80 and 81 respectively fastened into the end frame 14 and insulated from each other. Terminal connections 82 and 83 are made to the slip rings, and in this way the proper electric contact is made to the armature.

It will be understood from the above that the entire rotor including the permanent magnets forming the field as well as the magnetic member 60 are sealed within the fixed can or container 31 and hence can be in direct communication through openings 13 with the pump or other member driven by the motor. Similarly the two bearings 16 and 18 operate within the fluid, are completely sealed and enclosed, and hence do not present any problem of lubrication or leakage. The armature is wound in the stationary slots in the stator and connected through the stationary commutator while the brushes are mounted in a rotatable assembly which is driven in proper relation with the rotation of the field by a magnetic coupling which operates through the sealed container. This requires only a small amount of torque, merely enough to carry the brushes and slip rings against the friction created by their contact with the commutator and slip rings respectively, and provides for maintaining the desired completely sealed relation of the machine. The machine thus is adapted for operation without danger of loss of fluid and is highly advantageous in any condition where a completely sealed machine is desired.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A dynamoelectric machine comprising a stator, a winding on said stator, a commutator in fixed relation with said stator and connected to said winding, a rotor, a permanent magnet field carried by said rotor, a brush assembly mounted on said stator independently of said rotor for rotation relative to said commutator, and a magnetic coupling means effective between said rotor and said brush assembly for producing synchronous rotation of said assembly with said rotor.

2. A dynamoelectric machine comprising a stator, a winding on said stator, a commutator in fixed relation with said stator and connected to said winding, a rotor, a magnetic field on said rotor, means for sealing said stator apart from said rotor, a brush assembly mounted on said stator independently of said rotor for rotation relative to said commutator and located outside said sealing means, and a magnetic coupling means effective between said rotor and said brush assembly and operable through said sealing means for producing synchronous rotation of said assembly with said rotor.

3. A dynamoelectric machine comprising a stator, a winding on said stator, a commutator in fixed relation with said stator and connected to said winding, a rotor, a magnetic field on said rotor, means for enclosing and sealing said stator apart from said rotor, a brush assembly mounted on said stator independently of said rotor for rotation relative to said commutator and located outside said sealing means, and a magnetic coupling means operable through said sealing means at the end of said rotor for producing synchronous rotation of said brush assembly with said rotor.

4. A dynamoelectric machine comprising a stator, a winding on said stator, a commutator in fixed relation with said stator and connected to said winding, a rotor, a magnetic field on said rotor, a metallic container for enclosing and sealing said stator apart from said rotor, a brush assembly mounted on said stator independently of said rotor for rotation relative to said commutator and located outside said sealing means, and a magnetic coupling means operable through said sealing means at the end of said rotor for producing synchronous rotation of said brush assembly with said rotor.

5. A dynamoelectric machine comprising a stator, a winding on said stator, a commutator in fixed relation with said stator and connected to said winding, a rotor, a magnetic field on said rotor, a metallic container of a material having high internal resistance for enclosing and sealing said stator apart from said rotor, a brush assembly mounted on said stator independently of said rotor for rotation relative to said commutator and located outside said sealing means, and a magnetic coupling means operable through said sealing means at the end of said rotor for producing synchronous rotation of said brush assembly with said rotor.

6. A dynamoelectric machine comprising a stator, a winding on said stator, a commutator in fixed relation with said stator and connected to said winding, a rotor, a permanent magnet field on said rotor, means fixed to said stator for sealing said stator apart from said rotor, a brush assembly mounted on said stator independently of said rotor for rotation relative to said commutator and located outside said sealing means, a magnetic coupling means operable through said sealing means at the end of said rotor for producing synchronous rotation of said brush assembly with said rotor, and slip rings for establishing connection to said rotating brush assembly.

7. A dynamoelectric machine comprising a casing adapted to receive a fluid, a rotatable shaft, a rotor including a permanent magnet field on said shaft, said shaft and said field being exposed to said fluid, a sealing means, a stator supporting said sealing means in spaced relation to said rotor and preventing escape of said fluid from said rotor space, windings on said stator, a commutator connected to said windings, a brush assembly rotatably mounted in said stator independently of said rotor and outside said sealing means, and means effective through said sealing means for rotating said brush assembly in predetermined fixed synchronous relation with respect to said rotor.

8. A dynamoelectric machine comprising a casing adapted to receive a fluid, a stator, a rotatable shaft, a rotor including a permanent magnet field on said shaft, said shaft and said field being exposed to said fluid, a sealing means in the form of a container supported on and sealed with respect to said stator in spaced relation with said rotor, said sealing means being open at one end for access of said fluid into the rotor space and being closed at its opposite end preventing escape of said fluid from said rotor space, windings on said stator, a commutator connected to said windings, a brush assembly rotatably mounted in said stator independently of said rotor and outside said sealing means, and means effective through said sealing means for rotating said brush assembly in predetermined fixed synchronous relation with respect to said rotor.

9. A dynamoelectric machine comprising a casing adapted to receive a fluid, an end frame, a bearing in said end frame, a rotatable shaft journaled in said bearing, a magnetic field structure on said shaft, said shaft and said field being exposed to said fluid through said end frame, a sealing means for said rotor in the form of a closed cylindrical container, a stator supporting said sealing means in spaced relation to said rotor and preventing escape of said fluid from said rotor space, windings on said stator, a commutator connected to said windings, a brush assembly rotatably mounted in said stator independently of said rotor and outside said sealing means, and means effective through said sealing means for rotating said brush assembly in predetermined fixed synchronous relation with respect to said rotor.

10. A dynamoelectric machine comprising a casing adapted to receive a fluid, an end frame, a bearing in said end frame, a rotatable shaft journaled in said bearing, a magnetic field structure on said shaft, said shaft and said field being exposed to said fluid through said end frame, a sealing means for said rotor in the form of a closed cylindrical container, a stator supporting said sealing means in spaced relation to said rotor and preventing escape of said fluid from said rotor space, windings on said stator, a commutator connected to said windings, a brush assembly rotatably mounted in said stator independently of said rotor and outside said sealing means, and magnetic coupling members operable through said container for rotating said brush assembly in predetermined fixed synchronous relation with respect to said rotor.

11. A dynamoelectric machine comprising a casing adapted to receive a fluid, an end frame, a bearing in said end frame, a rotatable shaft journaled in said bearing, a magnetic field structure on said shaft, said shaft and said field being exposed to said fluid through said end frame, a sealing means for said rotor in the form of a closed cylindrical container, a stator supporting said sealing means in spaced relation to said rotor and preventing escape of said fluid from said rotor space, windings on said stator, a commutator connected to said windings, a brush assembly rotatably mounted in said stator outside said sealing means, and permanent magnetic coupling members operable through the end wall of said container for rotating said brush assembly in predetermined fixed relation with respect to said rotor.

12. A dynamoelectric machine comprising a rotatable shaft, bearings for journalling said shaft adjacent opposite ends of said machine, a permanent magnet field structure on said shaft forming a rotor, said rotor and said bearings being exposed to access of a fluid from one end of said shaft, means for preventing escape of fluid passing through the bearing adjacent the opposite end of said shaft, a stator in spaced relation to said rotor, a closed container between said stator and rotor preventing escape of said fluid from said rotor space, windings on said stator, a commutator connected to said windings, a brush assembly rotatably mounted in said stator outside said sealing means, and magnetic coupling means effective between said rotor and said brush assembly for causing rotation of said assembly in predetermined fixed relation with said rotor.

13. A dynamoelectric machine comprising a rotatable shaft, bearings for journalling said shaft adjacent opposite ends of said machine, a permanent magnet field structure on said shaft forming a rotor, said rotor and said bearings being exposed to access of a fluid from one end of said shaft, means for preventing escape of fluid passing through the bearing adjacent the opposite end of said shaft, a stator in spaced relation to said rotor, a closed container between said stator and rotor preventing escape of said fluid from said rotor space, windings on said stator, a commutator connected to said windings, a brush assembly rotatably mounted in said stator outside said sealing means, magnetic coupling means effective between said rotor and said brush assembly for causing rotation of said assembly in predetermined fixed relation with said rotor, and operable through the end wall of said sealing means for effecting rotation of said brush assembly in predetermined fixed relation with said rotor.

14. A dynamoelectric machine comprising a rotatable shaft, bearings for journalling said shaft adjacent opposite ends of said machine, a permanent magnet field structure on said shaft forming a rotor, said rotor and said bearings being exposed to access of a fluid from one end of said shaft, means for preventing escape of fluid passing through the bearing adjacent the opposite end of said shaft, a stator in spaced relation to said rotor, a closed container between said stator and rotor preventing escape of said fluid from said rotor space, windings on said stator, a commutator connected to said windings, a brush assembly rotatably mounted in said stator outside and sealing means, magnetic coupling means effective between said rotor and said brush assembly for causing rotation of said assembly in predetermined fixed relation with said rotor, operable through the end wall of said sealing means for effecting rotation of said brush assembly in predetermined fixed relation with said rotor, and slip rings coactive with said brush assembly for effecting electrical connection to said winding.

JOHN F. HAINES.

References Cited in the file of this patent

UNITED STATES PATENTS

| Number | Name | Date |
|---|---|---|
| 1,655,286 | Nietsche | Jan. 3, 1928 |
| 2,230,717 | De Lancey | Feb. 4, 1941 |